United States Patent [19]

Reinsch et al.

[11] Patent Number: 4,868,744
[45] Date of Patent: Sep. 19, 1989

[54] METHOD FOR RESTARTING A LONG-RUNNING, FAULT-TOLERANT OPERATION IN A TRANSACTION-ORIENTED DATA BASE SYSTEM WITHOUT BURDENING THE SYSTEM LOG

[75] Inventors: Roger A. Reinsch, Cupertino; Melvin R. Zimowski, San Jose, both of Calif.

[73] Assignee: International Business Machines Corporation, Armonk, N.Y.

[21] Appl. No.: 835,396

[22] Filed: Mar. 3, 1986

[51] Int. Cl.⁴ .......................... G06F 12/00; G06F 7/00
[52] U.S. Cl. ............................... 364/280.3; 364/281.9; 364/285.3; 371/12
[58] Field of Search ... 364/200 MS File, 900 MS File, 364/280.2, 280.3, 281.9, 285.2, 285.3; 371/12

[56] References Cited

U.S. PATENT DOCUMENTS

| | | | |
|---|---|---|---|
| 4,459,658 | 7/1984 | Gabbe et al. | 364/200 |
| 4,498,145 | 2/1985 | Baker et al. | 364/900 |
| 4,514,846 | 4/1985 | Federico et al. | 364/200 |
| 4,521,847 | 6/1985 | Ziehm et al. | 371/12 |
| 4,538,265 | 8/1985 | Day et al. | 371/12 |
| 4,641,305 | 2/1987 | Joyce et al. | 371/12 |
| 4,648,031 | 3/1987 | Jenner | 364/200 |
| 4,654,819 | 3/1987 | Stiffler et al. | 371/12 |
| 4,665,520 | 5/1987 | Strom et al. | 364/200 |
| 4,697,266 | 9/1987 | Finley | 371/12 |
| 4,703,481 | 10/1987 | Fremont | 371/12 |

*Primary Examiner*—Felix D. Gruber
*Attorney, Agent, or Firm*—R. Bruce Brodie

[57] ABSTRACT

A restartable load without logging method permits the restart of a LOAD operation from the last COMMIT point without requiring the writing of images of loaded records to the log. Instead, the method logs only a minimal amount of information, recording positions within the data sets to be loaded and within the tablespace being loaded.

4 Claims, 10 Drawing Sheets

EXECUTION OF A LOAD LOG(NO) INVOCATION UP TO THE OCCURRENCE OF AN INTERRUPTION

```
//LOADLOGN JOB 'RESTART OF LOAD LOG(NO) INVOCATION',CLASS=A,MSGCLASS=A,    X
//             MSGLEVEL=(1,1),USER=DBADM01,PASSWORD=DBADM01
//LOADSTEP EXEC PGM=DSNUTILB,PARM='DSN,LOADLOGN,RESTART'                   X ———(32)
//STEPLIB  DD DSN=DB2REL2.DSNLOAD,DISP=SHR
//SYSUT1   DD DSN=INDEXWRK,UNIT=SYSDA,SPACE=(CYL,(2,1)),
//            DISP=(MOD,DELETE,CATLG)
//SORTWK01 DD UNIT=SYSDA,SPACE=(4000,(20,20),,,ROUND)
//SORTWK02 DD UNIT=SYSDA,SPACE=(4000,(20,20),,,ROUND)
//SORTWK03 DD UNIT=SYSDA,SPACE=(4000,(20,20),,,ROUND)
//SORTWK04 DD UNIT=SYSDA,SPACE=(4000,(20,20),,,ROUND)
//UTPRINT  DD SYSOUT=A
//SYSPRINT DD SYSOUT=A
//SYSABEND DD SYSOUT=A
//SYSIN    DD *
    LOAD DATA
    INDDN  (SYSREC) ————(31)
    LOG(NO)
    WORKDDN(SYSUT1)
    INTO TABLE DBADM01.EMPLOYEE
        (EMPNO   POSITION(95:100) CHAR(6),
         NAME    POSITION(1:24)   CHAR(24),
         TITLE   POSITION(105:126) CHAR(22),
         ADDRESS POSITION(31:70)  CHAR(40),
         DEPTNO  POSITION(86:89)  CHAR(4),
         EMPLOC  POSITION(90:93)  CHAR(4))
/*
//SYSREC   DD DSN=DBADM01.INPUT,UNIT=SYSDA,DISP=(MOD,CATLG,CATLG)
//
```

JCL AND SYNTAX FOR THE RESTART OF A LOAD LOG(NO) INVOCATION

```
//LOADLOGN JOB 'LOAD LOG(NO) INVOCATION',CLASS=A,MSGCLASS=A,
//         MSGLEVEL=(1,1),USER=DBADM01,PASSWORD=DBADM01
//LOADSTEP EXEC PGM=DSNUTILB,PARM='DSN,LOADLOGN'
//STEPLIB  DD DSN=DB2REL2.DSNLOAD,DISP=SHR
//SYSUT1   DD DSN=INDEXWRK,UNIT=SYSDA,SPACE=(CYL,(2,1)),
//         DISP=(MOD,DELETE,CATLG)
//SORTWK01 DD UNIT=SYSDA,SPACE=(4000,(20,20),,,ROUND)
//SORTWK02 DD UNIT=SYSDA,SPACE=(4000,(20,20),,,ROUND)
//SORTWK03 DD UNIT=SYSDA,SPACE=(4000,(20,20),,,ROUND)
//SORTWK04 DD UNIT=SYSDA,SPACE=(4000,(20,20),,,ROUND)
//UTPRINT  DD SYSOUT=A
//SYSPRINT DD SYSOUT=A
//SYSABEND DD SYSOUT=A
//SYSIN    DD *
     LOAD DATA
       INDDN (SYSREC)                                   (20)
       LOG(NO)
       WORKDDN(SYSUT1)
       INTO TABLE DBADM01.EMPLOYEE                      (27)
         (EMPNO POSITION(95:100) CHAR(6),               (21)
          NAME POSITION(1:24) CHAR(24),                 (22)
          TITLE POSITION(105:126) CHAR(22),             (23)
          ADDRESS POSITION(31:70) CHAR(40),             (24)
          DEPTNO POSITION(86:89) CHAR(4),               (25)
          EMPLOC POSITION(90:93) CHAR(4))               (26)
/*
//SYSREC   DD DSN=DBADM01.INPUT,UNIT=SYSDA,DISP=(MOD,CATLG,CATLG)  (29)
//
```

FIG. 3  JCL AND SYNTAX FOR A LOAD LOG(NO) INVOCATION

METHOD FOR RESTARTING A LONG-RUNNING, FAULT-TOLERANT OPERATION IN A TRANSACTION-ORIENTED DATA BASE SYSTEM WITHOUT BURDENING THE SYSTEM LOG

TECHNICAL FIELD

This invention relates to transaction-oriented data base systems, and more particularly, those systems having LOAD utilities and Recovery Managers which regulate system activity in the event of faults or interruptions.

BACKGROUND

As pointed out by C. J. Date, "An Introduction to Database Systems", Vol. 2, Addison-Wesley Publishing Co., copyright 1983, in Chapter 1 thereof, the purpose of a data base system is to carry out transactions. In this regard, a transaction is a unit of work. It consists of the execution of an application specified sequence of operations beginning with a special BEGIN TRANSACTION operation and ending with either a COMMIT operation or a ROLLBACK operation. COMMIT is used to signal successful termination of the unit of work, while ROLLBACK is used to signal unsuccessful termination of work because of some exceptional condition. In transaction-oriented systems, a transaction such as transferring money from one account to another is a single atomic operation. It either succeeds or fails. If it fails, then nothing should have changed; that is, the effect should be as if it were never initiated.

Transaction-oriented systems usually include a Recovery Manager. A Recovery Manager is a subsystem component specializing in maintaining the atomic nature of transactions and reestablishing system operation. In order to reestablish an information state of affairs to a 100 percent fidelity, logging of all events occurs. The total log consists of a currently active online portion on direct access, plus an arbitrary number of earlier portions in archival store.

There may be many events which cause a system to stop and thus require a subsequent system restart. While the contents of main memory and volatile buffers are lost, the data base on nonvolatile media is usually not damaged. Transactions that were in progress at the time of the failure must be rolled back since they were not completed. In order to identify which transactions to roll back, a search of the entire log from the beginning would have to be made. This would be manifest by noting those transactions having a BEGIN TRANSACTION record but no termination, such as a COMMIT or other primitive. To avoid this, prior art utilizes checkpointing. This means that the contents of volatile memory representing transactions in process are copied out to the active log. Indeed, information constituting the checkpoint itself is made of record and written to the log data set, and its address also duly noted in a RESTART file in nonvolatile storage. Each checkpoint record contains a list of all transactions active at the time of the checkpoint. Thus, at system restart time, the Recovery Manager can obtain the address of the most recent checkpoint record from the RESTART file, It then locates that checkpoint record in the log and proceeds to search forward through the log from that point to the end. As a result of this process, the Recovery Manager is able to determine both the transactions that need to be undone to effectuate ROLLBACK and the transactions that need to be redone to effectuate COMMIT in order to restore the data base to a correct state. To implement this, the Recovery Manager starts with two lists, an UNDO list and a REDO list. The UNDO list initially contains all transactions listed in the checkpoint record. In contrast, the REDO list is initially empty. The Recovery Manager searches forward through the log starting from the checkpoint record. If it finds a BEGIN TRANSACTION record for a given transaction, it adds that transaction to the UNDO list. If it finds a COMMIT record for a given transaction, it moves that transaction from the UNDO to the REDO list. When the Recovery Manager reaches the end of the log, the UNDO list and the REDO list identify, respectively, those transactions that must be undone and those which must be redone. Secondly, it goes forward through the log, redoing the transactions in the REDO list. Lastly, the Recovery Manager works backward through the log again, undoing the transactions in the UNDO list. No new work can be accepted by the system until this process is complete.

Writing a change to the data base and writing the log record representing that change are two distinct operations. There is a possibility of failure occurring in the interval between the two. To enhance safety, the log record is always written first. This is termed a "writeahead log protocol". That is, a transaction is not allowed to write a record to the physical data base until at least the UNDO portion of the corresponding log record has been written to the physical log, and a transaction is likewise not allowed to complete the COMMIT processing until both the REDO and UNDO portions of all log records for the transaction have been written to the physical log.

In a transaction-oriented data base system of the type described above, all changes to the data base are written to a log in support of recovery in the event of interruption. As mentioned, each transaction utilizes BEGIN, COMMIT, or ROLLBACK primitives in order to bound the transaction. In this regard, REDOs ensure transaction return to the most recent COMMIT point. In contrast, UNDOs ensure return to the transaction BEGIN point. Illustrative of transaction system log writing and utlization operations include:

(a) Gawlick et al, U.S. Pat. No. 4,507,751, "Method and Apparatus for Logging Journal Data Using a Log Write Ahead Data Set", issued Mar. 26, 1985;

(b) Paradine et al, U.S. Pat. No. 4,159,517, "Journal Back-up Storage Control for a Data Processing System", issued June 26, 1979; and (c) Baker et al, U.S. Pat. No. 4,498,145, "Method and Apparatus for Assuring Atomicity of Multirow Update Operations in a Database System", issued Feb. 5, 1985.

The Gawlick, Paradine, and Baker patents respectively describe (a) the writing to log before record updating, (b) buffer dumping to a log, and (c) writing to a hard and soft log concurrently to assure multirow atomic updating. Significantly, the patented methods all relate to data movements, including those of loading which are paced or determined by the COMMIT points of transactions.

In transaction-oriented systems of the relational data base type, it is the LOAD software utility which moves sequential data sets to a relational tablespace.

In the event of an interruption, it is also the LOAD utility which must either restart from the beginning in order to avoid the overhead of log writing, or alternatively, restart from the last COMMIT point (i.e. The end of the last transaction) and incur said log writing.

The Invention

It is an object of this invention to devise a method for minimizing the number of steps involved in the restart of long-running, fault-tolerant operations in a transaction-oriented data base system. It is a related object that the method more particularly utilize a restartable LOAD utility from an intermediate COMMIT point without introducing undesirable operational characteristics.

The foregoing objects are satisfied by a method for executing a restartable LOAD operation in a transaction-oriented relational data base system in which all changes to the data base are typically written to a log in support of recovery in the event of interruption.

In this system, each transaction utilizes BEGIN, COMMIT, or ROLLBACK primitives to bound the transaction. The REDO operations ensure transaction return to the most recent COMMIT point, while the UNDO operations ensure return to the transaction BEGIN point. The system includes a first address space containing sequential input data sets, and a second address space containing a relational tablespace. A LOAD operation moves the data sets from the first into the second address space by way of a series of nonoverlapping transactions. In this regard, the LOAD operation does not employ either before or after images in the log for any data set being loaded. While multiple address spaces are described above, they are not necessarily limiting.

The method of the invention comprises the steps of (a) reiteratively transferring a predetermined quantity of the data set to the end of the tablespace, recording the current position within the data set, and establishing another end position within the tablespace, the reiterative transfer continuing until the data set either becomes exhausted or the transaction in progress becomes interrupted; and (b) in the event of transaction interruption, restarting the LOAD operation from the last COMMIT point by emulating the REDO and UNDO without recourse to the before and after images of the tablespace from the log.

BRIEF DESCRIPTION OF THE DRAWING

FIGS. 5 and 6 set out timelines of a data base system with a LOAD operation in progress including transactions, force writing of buffers, checkpoints, and COMMIT points, with respect to the use of the LOAD utility according to the invention. Miré particularly, FIG. 5 sets out the interruption of a LOAD utility invocation consisting of multiple transactions, while FIG. 6 illustrates the restart and completion of the LOAD utility invocation from the last COMMIT point.

DESCRIPTION OF THE PREFERRED EMBODIMENT AND INDUSTRIAL APPLICABILITY

Figure 1:
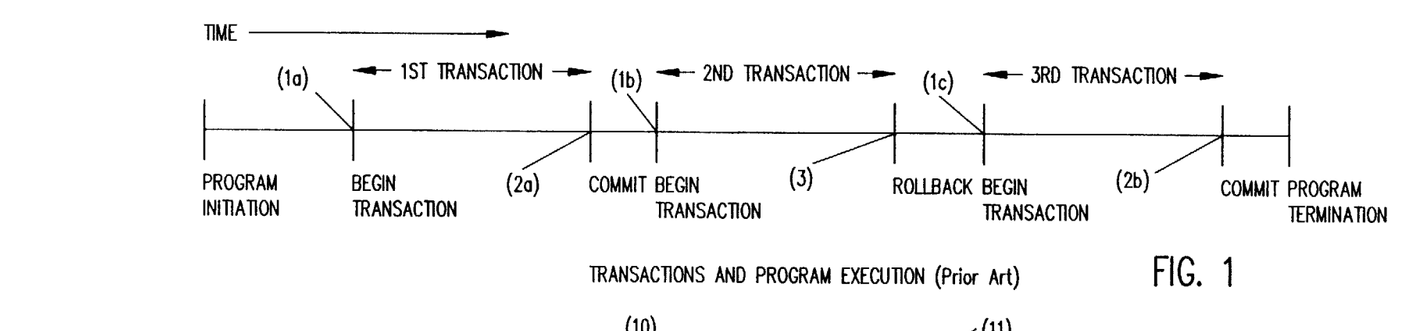
FIG. 1 shows transaction execution according to the prior art.
Figure 7:
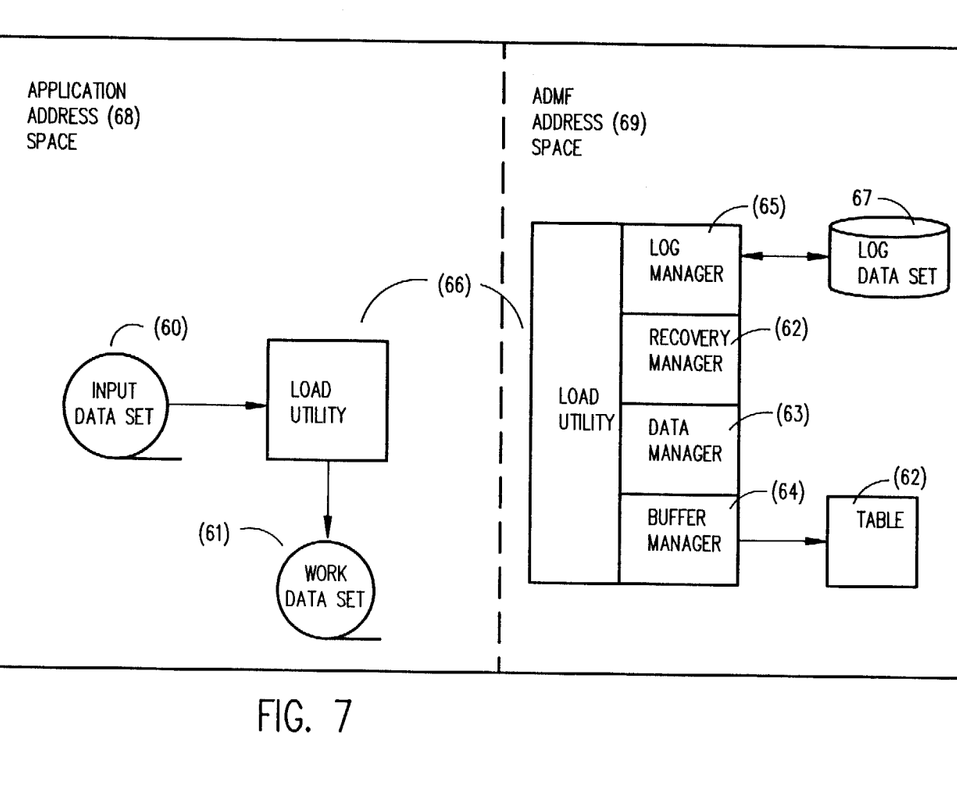
FIG. 7 depicts the high-level coupling between the resource managers participating in the method of the invention.
Figure 8A:
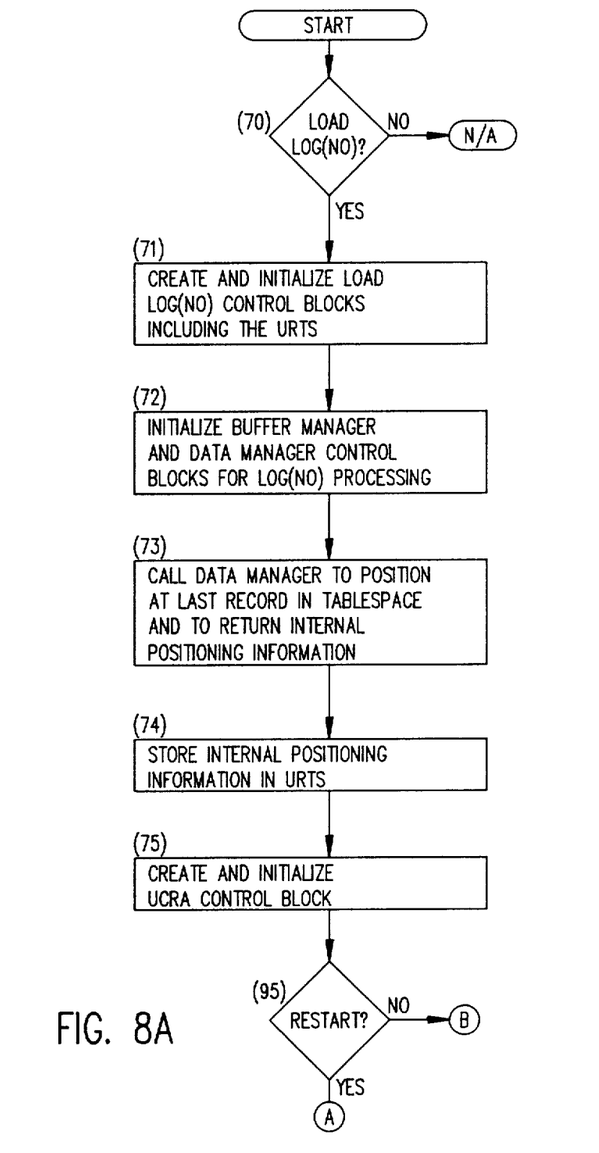
FIGS. 8A through 8D depict the flow of control from the invocation of the LOAD LOG(NO) command, the transfer of data set elements, and restart processing according to the method the invention.
Figure 8B:
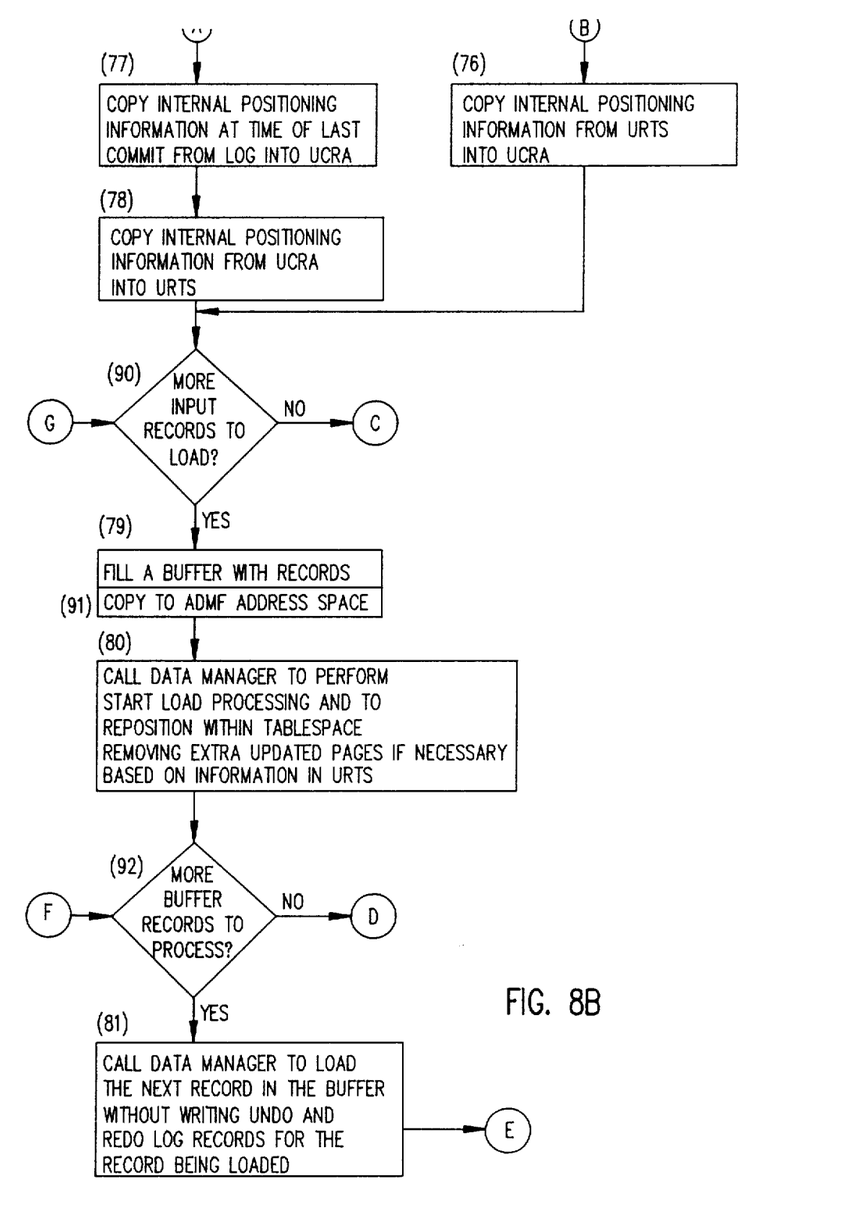
Figure 8C:
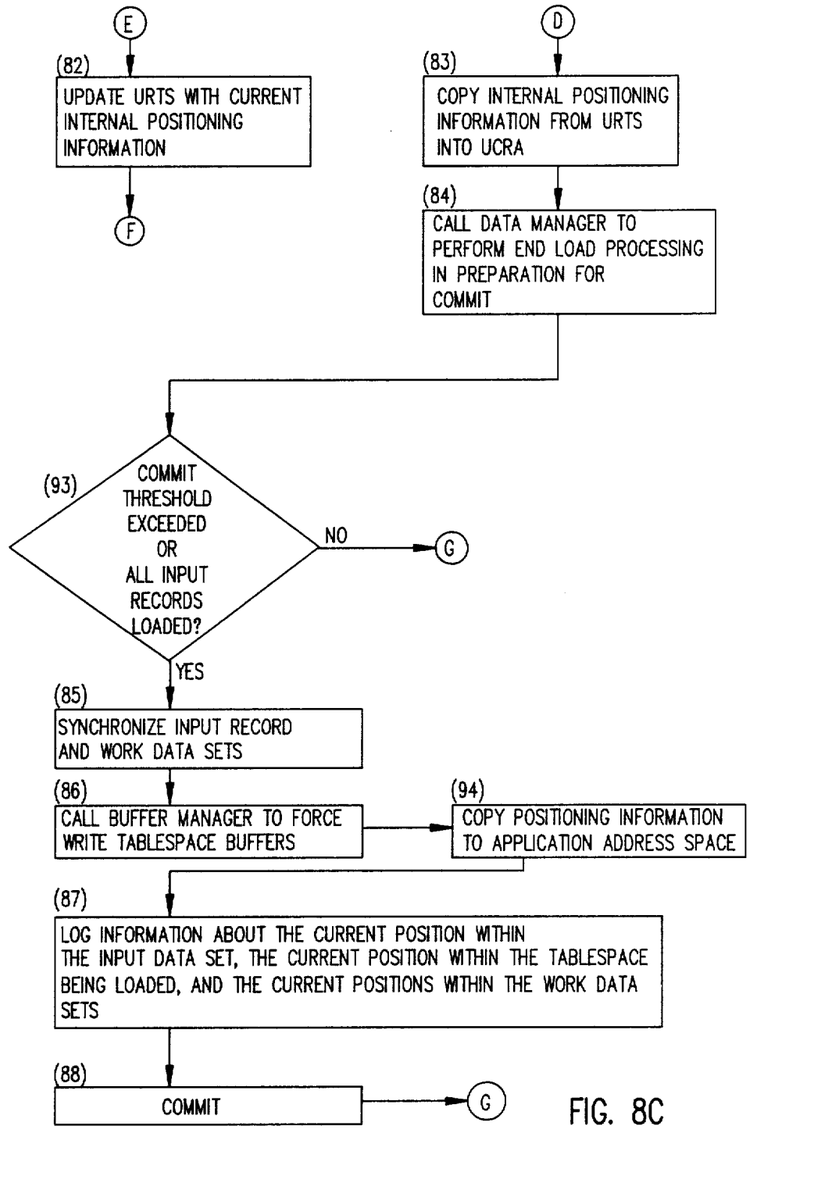
Figure 8D:
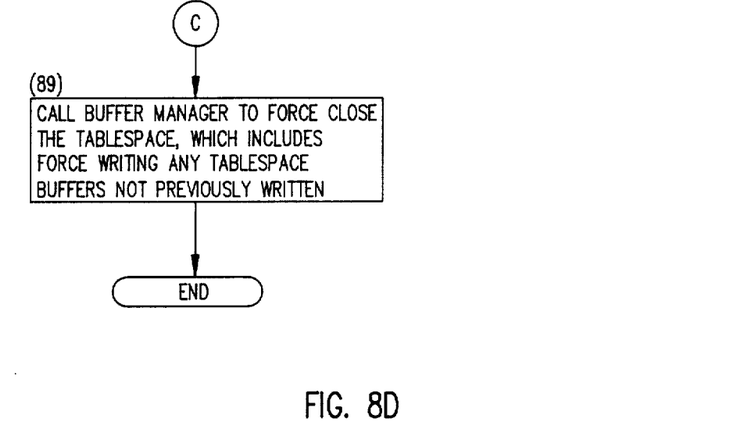

Referring now to FIGS. 1 and 7, there is shown a timeline of various types of primitives (BEGIN (1a, 1b, 1c), COMMIT (2a, 2b), ROLLBACK (3)) which bound transactions. It should be observed that transactions cannot be nested. Note, a transaction starts with the BEGIN primitive and terminates with a COMMIT. Implicitly, transactions are not lost, partially done, or done more than once. To assure both effectuation of a transaction and recovery in the event of interruption, transaction-oriented data base systems include a Recovery Manager. The Recovery Manager (62) initiates the transaction responsive to an external request, opens up the necessary access paths through service calls to the Data Manager (63) and Buffer Manager (64), maintains logging through service calls to the Log Manager (65) as the elements of the transaction proceed, and terminates the transaction at an appropriate COMMIT point. The Recovery Manager is also invoked whenever transaction processing is interrupted.

Figure 2:
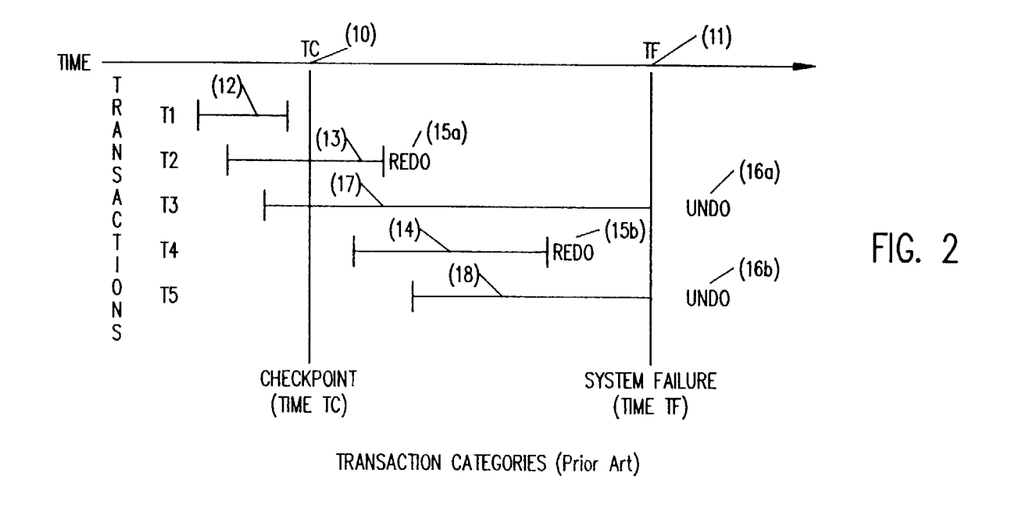
FIG. 2 shows a timeline of transactions in states of completion with reference to checkpoint and system failure according to the prior art.

Referring now to FIG. 2, there is shown a timeline of transactions T1-T5 in relation to checkpoint time TC (10) and system failure time TF (11). It should be observed that a system failure has occurred at time TF, and that the most recent checkpoint prior to time TF was taken at time TC. Note that transactions of type T1 (12) were completed before time TC. Transactions of type T2 (13) were started prior to time TC and completed after time TC, and before time TF. Also, transactions of type T4 (14) started after time TC and completed before time TF, together with transactions of type T2, are subject to REDO (15a, 15b). In contrast, transactions of type T3 and T5 are subject to UNDO (16a, 16b). Both T3 (17) and T5 (18) were not completed prior to system failure at time TF.

As previously mentioned, the software LOAD utility (66) moves sequential data sets from a first address space to a relational tablespace. It is not unusual for the LOAD utility to process large quantities of data. This takes a considerable amount of time. If, during this interval the LOAD operation is interrupted before completion, then to require a restart of the entire LOAD operation from the beginning becomes unsatisfactory from a user perspective.

One prior art solution involving a software LOAD utility permitted the LOAD utility to issue an internal COMMIT point after completing the processing of each predetermined block of buffered data. This guaranteed the ability to restart from the last internal COMMIT point by writing a copy of the loaded records to the log. Since the active portion of the log is a finite data set, this often forced archiving of the log during execution. On the other hand, if such were to be avoided, the only alternative to burdening the log writing operation was to restart from the beginning. Reference should be made to the following IBM publications for greater detail:

(1) SQL/Data System Concepts and Facilities for VM/SP, GH24-5065;

(2) SQL/Data System Planning and Administration for VM/SP, SH24-5043; and (3) SQL/Data System Data Base Services Utility for VM/SP, SH24-5069.

To satisfy the objects of the invention, the method of the invention should restart from an intermediate COMMIT point without flooding the log with data records. This is accomplished by logging (67) only a minimal amount of information, recording positions within the data sets to be moved and within the tablespace to be loaded.

Figure 3:
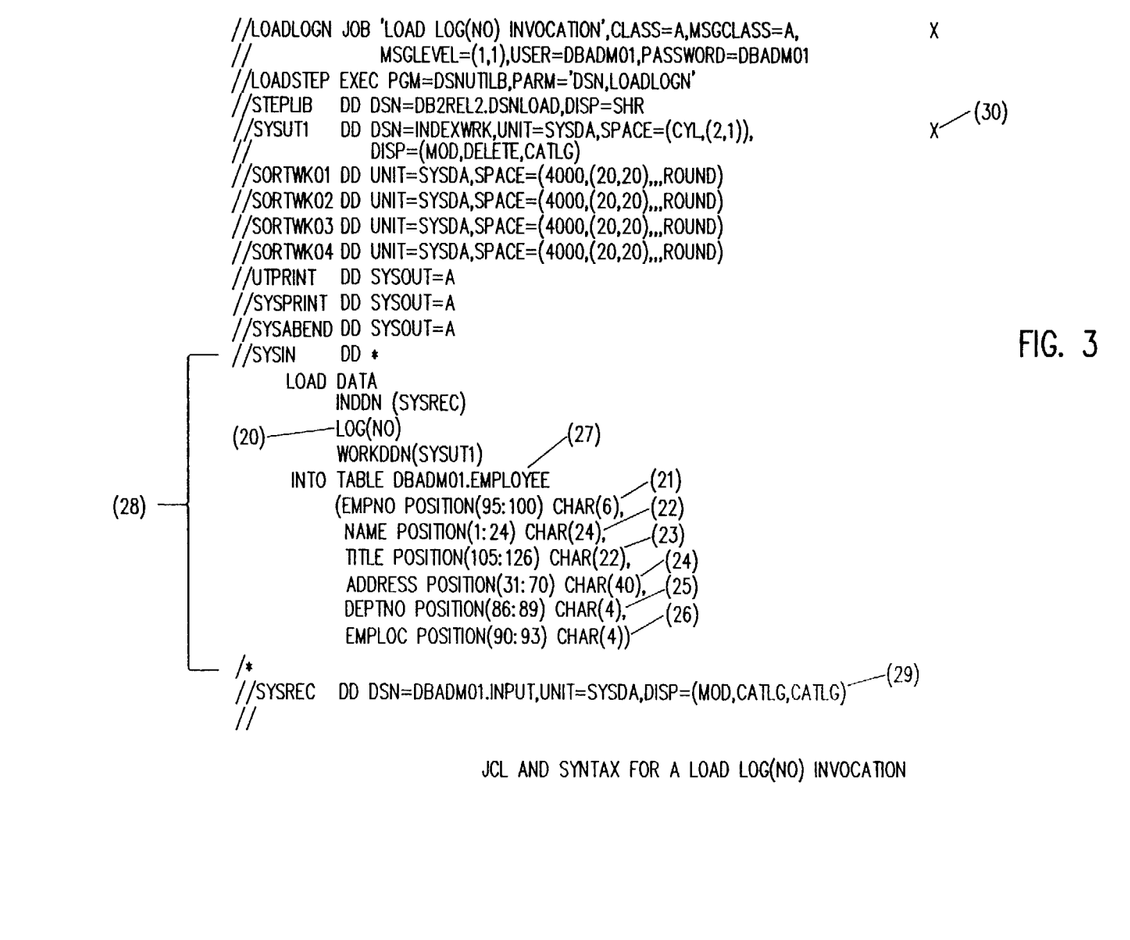
FIG. 3 shows an example of the JCL and syntax for a LOAD LOG(NO) invocation.
Figure 4:
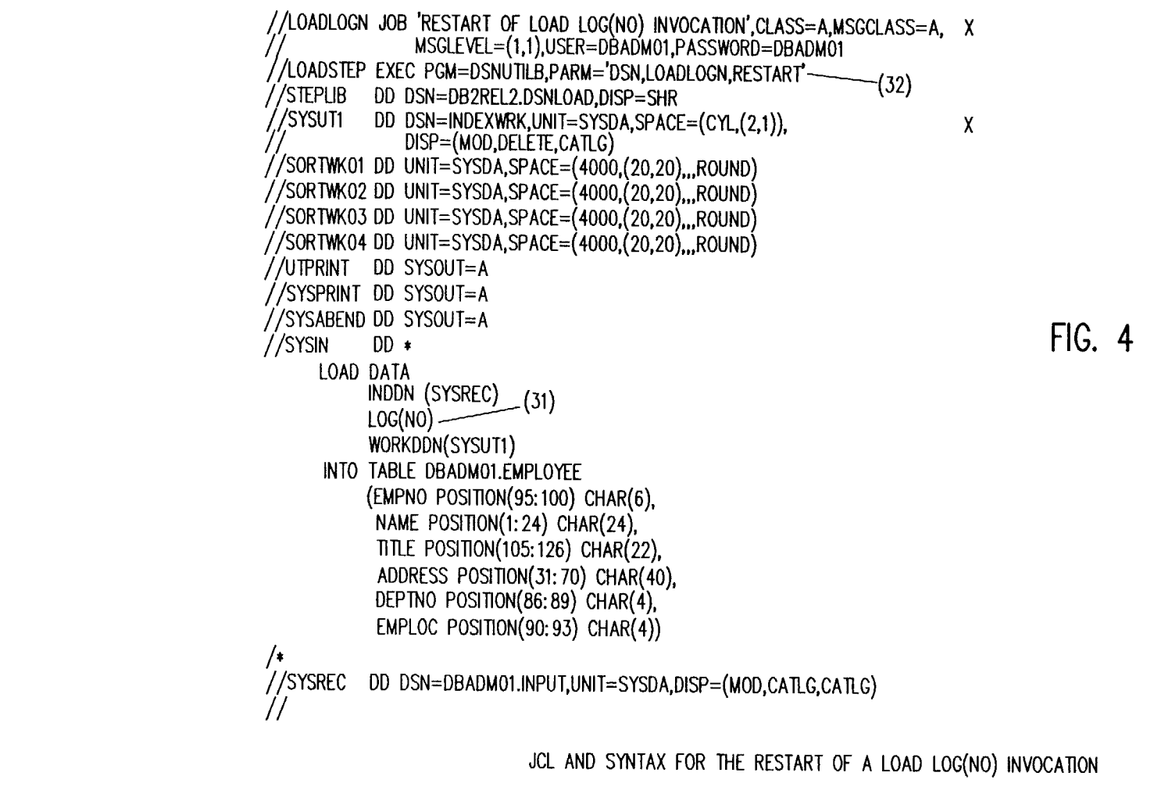
FIG. 4 shows an example of the JCL and syntax for the restart of the LOAD LOG(NO) invocation.

Referring now to FIG. 3, there is shown the JCL and syntax for a LOAD LOG(NO) invocation, and in FIG. 4, the JCL and syntax for the restart of the LOAD LOG(NO) invocation. JCL is an acronym for Job Control Language. This is a language facility used on large systems such as the IBM 370 to (a) name a series of programs to be executed; (b) define the executing machine parameters; and (c) set priorities among the programs and associate data sets with particular system functions. A LOAD LOG command admits of either a "yes" or "no" designation (20). If a "no" designation is made, then execution of a LOAD LOG(NO) writes no REDO or UNDO records containing loaded data to the log. Is does record, however, a minimal amount of information in the log at each COMMIT (2a, 2b) point. The informatio identifies the utility's position within the data sets to be moved (60), within work data sets (61), and within the tablespace being loaded (62) at the time the COMMIT was issued. This information permits a LOAD LOG(NO) invocation to reposition itself consistently within these objects during restart.

A LOAD LOG(NO) invocation has no REDO log records to reconstruct the state of the tablespace during restart processing. Further, there is no assurance that commited tablespace pages may be written prior to the beginning of the utility restart processing. Therefore, the LOAD invocation itself must guarantee that all updated tablespace pages are written prior to the terminal phase (Phase II) of a two-phase COMMIT operation. Parenthetically, the first phase of a two-phase COMMIT means that the system must force all log records involving a transaction to the log. If there are multiple participants in a transaction, each participant must indicate the state of affairs to a coordinating element. In Phase II, a coordinator will broadcast a COMMIT to all of the transaction participants so as to complete processing. This can occur only if all of the participants have arrived at the same completion state. Otherwise, the transaction is aborted by all participants.

As mentioned, the LOAD LOG(NO) invocation must guarantee that all updated tablespace pages are written prior to Phase II of the COMMIT. This is accomplished by requiring the Buffer Manager (64) to use a synchronous force write operation during Phase I of the COMMIT. This initiates the synchronous write of all updated system pages that have not yet been written for a particular tablespace (62).

Suppose a LOAD LOG(NO) invocation has no UNDO log record to enable it to reconstruct the state of the tablespace during restart processing. Also, updated system pages that have been written but not committed may be present in the tablespace at the beginning of this utility restart. Since the associated records will be loaded again by the restarted LOAD LOG(NO) invocation, the LOAD utility (60) itself must again guarantee that extra updated pages be removed from the tablespace prior to restarting from the last COMMIT point. The utility can again reference the Data Manager (63) to initiate a LOAD protocol to remove uncommitted data from the tablespace. This invocation provides the Data Manager with a position within the tablespace at the last COMMIT point (77, 78, 80). The Data Manager may then erase any extraneous data, and thus guarantee that the tablespace page control information is consistent with the contents of the tablespace. At this point, the LOAD utility can restart from the last COMMIT point.

The Data Manager protocols permit a LOAD LOG(NO) invocation to (a) request the position of the last record within the tablespace (73); or (b) request that all records beyond a certain point within the tablespace be deleted (80), and that the tablespace page control information, including the position of the last record within the tablespace, be updated accordingly.

The Buffer Manager (64) protocol permits a LOAD LOG(NO) invocation to force write buffers to a tablespace for which it holds an exclusive lock (86).

Force writing buffers to the tablespace guarantees that a known quantity of tablespace data has been written to disk. LOAD LOG(NO) uses this protocol to ensure that the minimum amount of data required for restarting at the last COMMIT point has always been written to disk prior to a request for restarting from the last COMMIT point.

A LOAD invocation executes in two address spaces: an application address space (68), and a relational data base address space called the Advanced Data Base Manager Facility (ADMF) address space (69). The basic flow within each address space for a LOAD LOG(NO) invocation (70) is as follows:

Application Address Space

In the following paragraphs, reference numerals are selectively inserted to provide a correlation between the object or processing construct described, and resource manager and flow-of-control representations as depicted in FIGS. 7 and 8.

Request that an ADMF Load Utility module (DSNURWIT) perform ADMF address space initialization processing (66).

Do until all unprocessed records in the input data set have been processed (90):

Fill all application address space buffer with unprocessed records from the input data set (79).

Request than an ADMF Load Utility module (DSNURWBF) load the input data records from the application address space buffer into the tablespace being loaded (91, 80, 92, 81-84).

If the number of application address space buffers processed since the last COMMIT exceeds an internal threshold value or the entire input data set has been processed (93):

Synchronize the input and work data sets (85).

Request that an ADMF Buffer Manager module (DSNBWFOR) force write the ADMF buffers for the tablespace being loaded to disk (86).

Transfer information about the current position within the tablespace being loaded (contained in the UCRA) from the ADMF address space to the application address space (94).

LOG information about the current position of unprocessed records within the input data set, the current position within the tablespace being loaded, and the current positions within the work data sets (87).

COMMIT the changes made to the tablespace being loaded since the last COMMIT or since the start of processing (88).

Request that an ADMF Load Utility module (DSNURWIT) perform ADMF address space termination processing (89).

ADMF Address Space
DSNURWIT

If initialization processing has been requested:

Initialize ADMF address space control blocks (including a control block called the UTRS) for LOAD Utility processing (71).

Initialize Buffer Manager and Data Manager control blocks and internal indicators for LOG(NO) processing (72).

Invoke Data Manager (DSNISLOD) to position at the last record within the tablespace being loaded and to return the internal positioning information (73).

Record the internal positioning information in the URTS (74).

Allocate a positional information control block (75) (also called the UCRA).

If not a restarted invocation (95):
  Copy the internal positioning information from the URTS into the UCRA (76).

If a restarted invocation (95):
  Restore the internal positioning information in the UCRA from the last information logged during the last LOAD invocation for the tablespace being loaded (77).
  copy the internal positioning information within the tablespace being loaded from the UCRA into the URTS in preparation for any required repositioning that the Data Manager may need to perform on the next Data Manager Start Load (DSNISLOD) invocation (78).

If termination processing has been requested:

Invoke Buffer Manager (DSNICLPS) to force close the tablespace being loaded, which includes force writing any buffers not previously written (89).

DSNURWBF

Move the application address space buffer containing the input data records being loaded into an ADMF address space buffer (91).

Invoke Data Manager (DSNISLOD) to perform Start Load processing including any required repositioning within the tablespace being loaded that the Data Manager needs to affect (80).

Do while input data records in the ADMF address space buffer remain to be processed (92):

Invoke Data Manager (DSNILOAD) to load the next input data record into the tablespace being loaded, without writing UNDO or REDO records to the LOG for the input data record, and to record information about the current position within the tablespace being loaded into the URTS (81, 92).

Copy the information about the current position within the tablespace being loaded from the URTS into the UCRA (83).

Invoke Data Manager (DSNIENDL) to perform End Load processing including the update of tablespace page control information in preparation for COMMIT (84).

ILLUSTRATIVE EXAMPLE OF THE METHOD
The Load Utility Invocation

Consider a Load Utility invocation that is to load information about employees into an EMPLOYEE (27) table.

Assume that the input data set consists of 1,000,000 fixed-length employee records each 100 bytes in length, and that each record contains a unique employee number (21) along with an employee's name (22), address (24), title (23), department number (25), and work location (26).

Further, assume that the application address space and ADMF address space buffers are of size 32K, and that the internal threshold value for COMMIT is 100. Also, assume that the tablespace page size is 4K.

Finally, assume that the EMPLOYEE table resides in the same tablespace as another table, and assume also that the EMPLOYEE table and the other table contain 2152 and 212 rows respectively prior to execution of the Load Utility invocation.

FIG. 3 presents the JCL and syntax for a LOAD LOG(NO) (20) invocation that performs this task. Note that the SYSIN DD statement stream (28) defines the Load Utility invocation, that the SYSREC DD statement defines the input data set (29), and that the SYSUT1 DD (30) statement defines a work data set used later for building indices.

Buffer Usage and Frequency of COMMIT

The application address space and ADMF address space buffers contain both data records and control length information. Buffer length control information takes up four bytes per buffer and record length control information takes up four bytes per record. Therefore, each filling of the 32K application address space buffer transfers 315 records from the input data set into the application address space memory, since control information takes up 1264 bytes.

Figure 5:
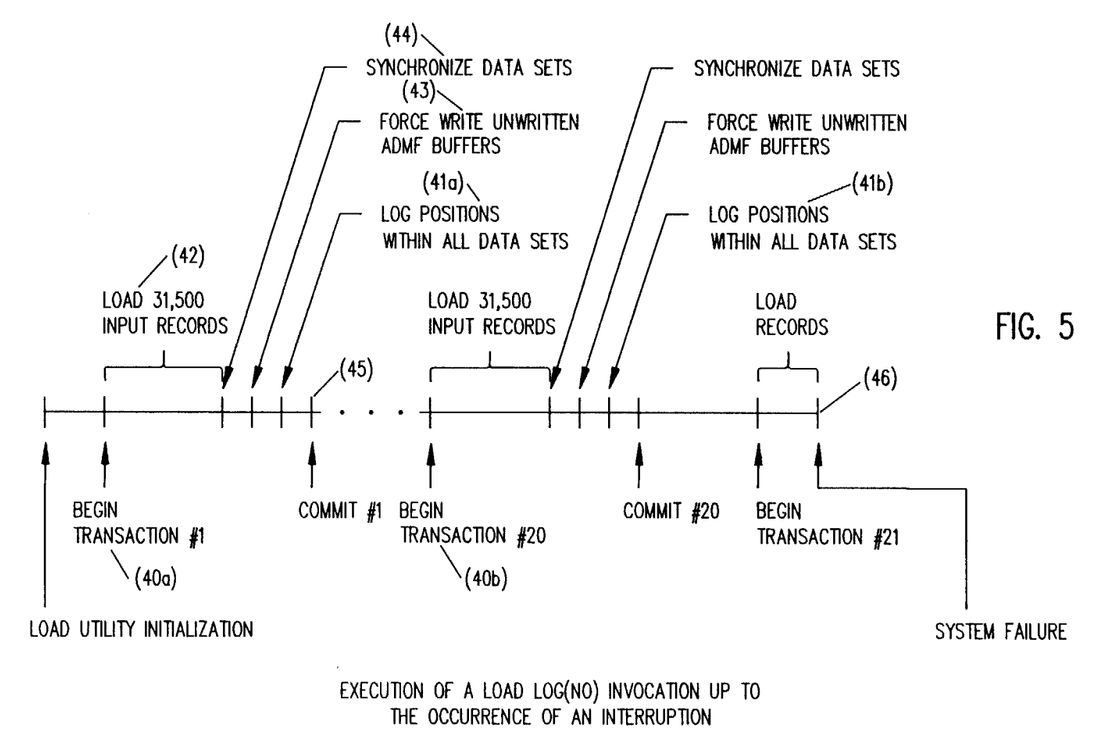

Consequently, the Load Utility invocation fills the 32K application address space buffer 3175 times. Since the invocation commits after every 100 application address space buffers, the Load Utility invocation consists of 32 transactions (50). Thus, following an interruption, restart of the LOAD LOG(NO) invocation from an internal COMMIT point will logically occur at the beginning of one of the 32 transactions (40a, 40b).

Checkpoint Information and Use of the Log

Both LOAD LOG(NO) and LOAD LOG(YES) invocations log information about the current position of unprocessed records within the input data set, the current position within the tablespace being loaded, and the current positions within one or more work data sets (41a, 41b). Log record control information and checkpoint control information require 52 bytes. Recording the current position within the tablespace requires 24 bytes. Recording the position within the input data set or within the work data sets requires 76 bytes per access method services buffer. The log space requirements per log record for logging. positional information are similar for LOAD LOG(NO) and LOAD LOG(YES) invocations. However, a LOG(NO) invocation writes log records for recording positional information one-tenth as often as LOG(YES) invocation.

A LOAD LOG(NO) invocation does not write REDO or UNDO records to the log for the records being loaded. This results in a drastic reduction of log usage for a LOAD LOG(NO) invocation that loads large quantities of data. A LOAD LOG(YES) invocation that accomplishes the same task as the LOAD LOG(NO) invocation of FIG. 3 will write a log record for each page written to the tablespace. Since 40 input data set records fill a page, a load of 1,000,000 records will load approximately 25,000 pages. Since each log record requires 40 bytes of control information as well as an image of the page, a LOAD LOG(YES) invocation will consume approximately 103,400,000 additional bytes of the log.

Execution of the Load Utility

Initialization processing for the execution of the LOAD LOG(NO) invocation of FIG. 3 obtains and initializes the required control blocks and structures including the URTS and the UCRA (71-75, 95). Initialization processing also establishes the starting position for the load as the first free position following the 2364 records present in the tablespace. Initialization processing records this first record position both within the URTS and the UCRA (76).

The Load Utility then transfers the first 315 records from the input data set to the application address space buffer (79). Since repositioning within the tablespace is not required, the loading of records begins at the position recorded within the URTS and UCRA. Load record processing places each successive record into the tablespace directly behind the last loaded record and records the current position in the URTS (81, 82). When record processing for the application address space buffer is complete, load processing copies the current record position within the tablespace being loaded from the URTS into the UCRA (83).

The Load Utility proceeds in the same fashion for the next 31,185 records within the input data set. It reiteratively transfers 315 records from the input data set to the application address space buffer and then processes the contents of that buffer as it processed the first buffer.

After load record processing completes for the 100th buffer, load processing prepares for the first commit. Preparation for COMMIT consists of force writing ADMF buffers to disk (43) and logging positioning information (41a). Preparation begins by force writing all ADMF buffers that contain any of the 31,500 most recently loaded records and that have not already been written. Load processing then gathers positional information. It notes its current position in the tablespace as being at the 33,864th record, its current position in the input data set as being at the 31,500th record, and its corresponding position within the work data set (44). The position in the work data set depends on the number of indices defined on the EMPLOYEE table and the number of bytes in the keys of the indices. After logging its current positional information, load commits (45) the 31,500 most recently loaded records.

Load processing continues to commit after each loading of 31,500 records until it loads the final application address space buffer and issues the final COMMIT (50).

Example of Interruption and Restart Processing

Assume that interruption of the Load Utility occurs as the utility loads the 636,348th record (46). At this point, the Load Utility is loading the 48th record of the 2021st application address space buffer. The current position within the tablespace is at the 638,712th record. The current position within the input data set is at or beyond the 636,615th record. The position in the work data set depends on the number of indices defined on the EMPLOYEE table, on the number of bytes in the keys of the indices, and on the fact that 2020 buffers have been successfully loaded prior to the interruption. FIG. 5 illustrates the execution of the LOAD LOG(NO) invocation up to the occurrence of the interruption.

FIG. 4 presents the JCL an syntax for the restart of the LOAD LOG(NO) (31) invocation from an internal COMMIT point. Note that the only change to the original JCL and syntax is the addition of the RESTART (32) parameter on the EXEC JCL statement.

Restart load record processing will begin loading records into the tablespace from the start of the 2001st application address space buffer of the original invocation. In order to accomplish restart in this fashion, initialization processing reconstructs the internal processing state as it existed following the 20th COMMIT.

Figure 6:
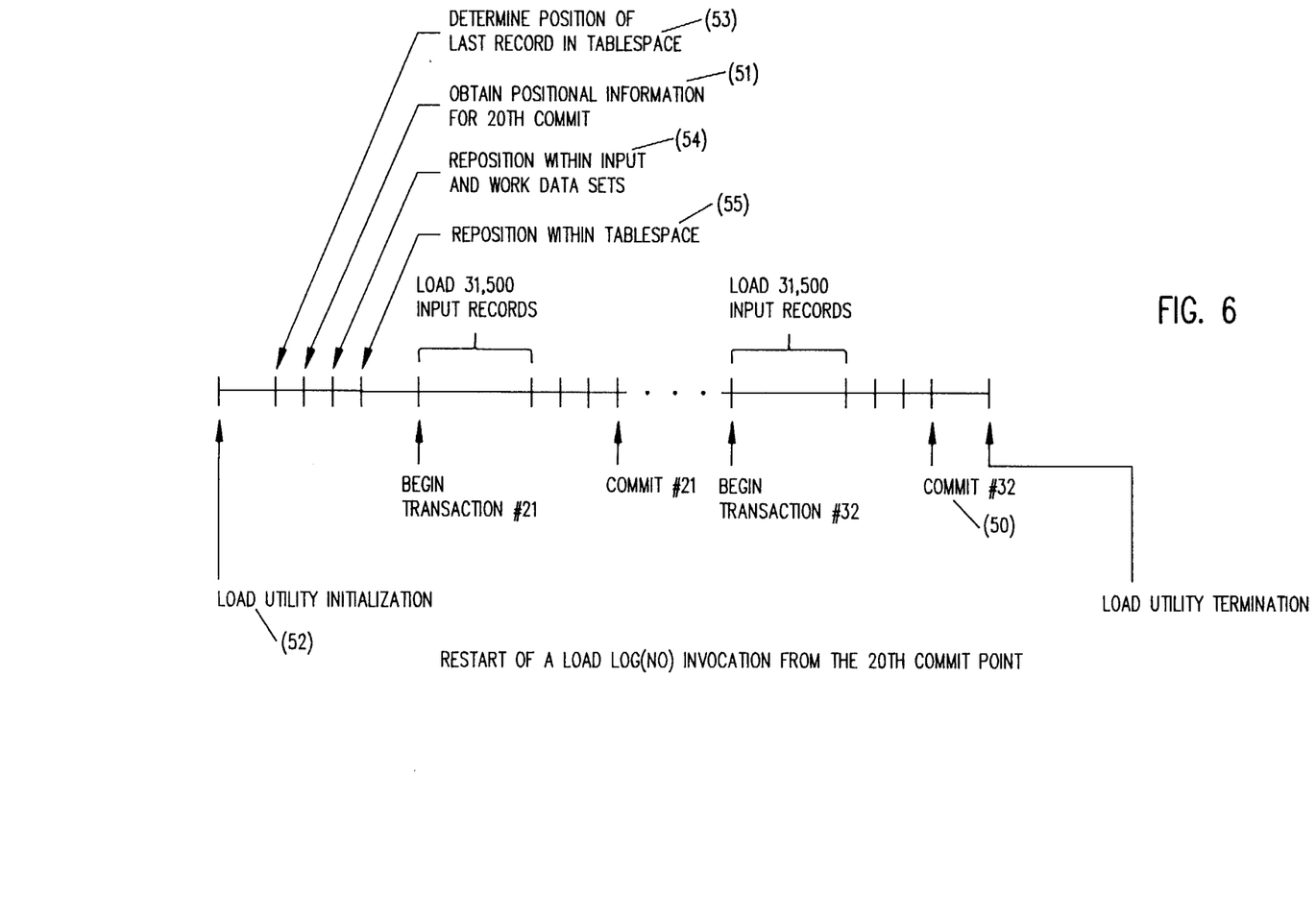

Restart processing begins with initialization processing. Initialization processing (52) obtains and initializes the required control blocks and structures, including the URTS and the UCRA (71-75, 95). Initialization processing then establishes the position of the last record within the tablespace that was written to the disk prior to the interruption (53). For the interrupted LOAD LOG(NO) invocation, this position can be anywhere in the tablespace from the 632,364th record to the 638,712th record. Initialization processing then reads the logged information to obtain the position within the input data set, the position within the tablespace being loaded, and the position within the work data set at the time the 20th COMMIT occurred. Initialization processing records this information in the appropriate fields of the UCRA and URTS (77-78).

Following initialization, the Load Utility opens the input data set and the work data set, restoring its current position within each to the position held following the completion of the 20th COMMIT (54). The Load invocation then transfers the next 315 records from the input data set to the application address space buffer. The first record in the application address space buffer will be the 630,001st record of the input data set. Since repositioning within the tablespace is now required, the Load Utility invokes the Data Manager to delete any records present within the tablespace following the 632,364th record (55). Restart processing is then complete, and the execution of the Load invocation proceeds as usual, loading buffer after buffer of input data until it processes all records of the input data set. FIG. 6 illustrates the execution of the restart of the LOAD LOG(NO) invocation from the 20th COMMIT point to completion.

While only certain preferred features of this invention have been shown by way of illustration, many changes and modifications will occur to those skilled in the art. Therefore, it is to be understood that the appended claims are intended to cover all such modifications and changes as fall within the true spirit of the invention

We claim:

1. A method for restarting a long-running, fault tolerant operation in a transaction-oriented data base system with minimum recourse to any event recording portion of such system such as a log, said system comprising a store having a data base, said data base including a log, a sequential data set, and a data base formatted object; a computer managing transaction, data base, and recovery processing; and means responsive to the computer for accessing the store, said data base formatted object occupying a specified range of addresses within the store, all transaction-oriented changes to the data base being written to the log in support of recovery in the event of interruption, each transaction utilizing BEGIN, COMMIT, or ROLLBACK primitives to bound said transaction, REDOs ensuring transaction return to the most recent COMMIT point, while UNDOs ensuring return to the transaction BEGIN point, comprising the computer-implemented steps of:
(a) reiteratively moving a predetermined quantity of the sequential data set from a first position in the store and appending said predetermined quantity to the end of the specified range of addresses of said data base formatted object at a second position within said store, recording in the log concurrent with such reiterative movement only of the current position within the data set and the newly established end position of the data base formatted object, and establishing another end position within the data base formatted object, said step continuing either until the data set becomes exhausted of a transaction in progress becomes interrupted (FIGS. 3, 5); and (b) in the event of transaction interruption, restarting the long-running operation from the last COMMIT point by referencing only the most recently recorded position within the data set and the most recently recorded end position of the data base formatted object, performing REDO and UNDO processing on that portion of the moved data set of step (a) measured from the referenced recorded positions, and repeating step (a) processing (FIGS. 4, 6).

2. A method according to claim 1, wherein the data base formatted object is a relational tablespace.

3. A method according to claim 1, wherein said long-running operation is of the type in which the data set is moved from the first to the second position by way of a series of nonoverlapping suboperations.

4. A method for executing a restartable LOAD operation in a transaction-oriented relational data base system with minimum recourse to any event recording portion of such system such as a log.

said system comprising a store having a data base, said data base including a log, a sequential data set, and a relational tablespace; a computer managing transaction, data base, and recovery processing; and means responsive to the computer for accessing the store, said relational tablespace occupying a specified range of addresses within the store, all transaction-oriented changes to the data base being written to the log in support of recovery in the event of interruption, each transaction utilizing BEGIN, COMMIT, or ROLLBACK primitives to bound said transaction, REDOs ensuring transaction return to the most recent COMMIT point, while UNDOs ensuring return to the transaction BEGIN point, comprising the computer-implemented steps of:
(a) reiteratively moving a predetermined quantity of the sequential data set from a first position in the store and appending said predetermined quantity to the end of the specified range of addresses of said relational tablespace at a second position within said store in a series of nonoverlapping suboperations, recording in the log concurrent with such reiterative movement only of the current position within the data set and the newly established end position of the relational tablespace, and establishing another end position within the relational tablespace, said step continuing either until the data set becomes exhausted or a transaction in progress becomes interrupted (FIGS. 3, 5); and (b) in the event of transaction interruption, restarting the long-running operation from the last COMMIT point by referencing only the most recently recorded position within the data set and the most recently recorded end position of the relational tablespace, performing REDO and UNDO processing on that portion of the moved data set of step (a) measured from the referenced recorded positions, and repeating step (a) processing (FIGS. 4, 6).

* * * * *